United States Patent Office 3,468,794
Patented Sept. 23, 1969

3,468,794
ANAEROBIC DIGESTION PROCESS
Clifford Leonard Amero, East Walpole, Mass., assignor to Bird Machine Company, South Walpole, Mass., a corporation of Massachusetts
Filed Feb. 23, 1968, Ser. No. 707,618
Int. Cl. C02c 1/14
U.S. Cl. 210—4                  15 Claims

ABSTRACT OF THE DISCLOSURE

Process for improving sludge digestion in anaerobic digesters. Sludge is withdrawn from a digester, centrifuged to remove a fraction of the mother liquor low in solids and acidic, the remainder being returned for further digestion usually to the same digester. By replacing the removed liquor with less acid liquor and by suitably regulating the process undesired acid build-up in the digester is minimized. By selectively utilizing as the source of replacement water raw sludge or water essentially free of solids, the solids consistency in the digester is increased or maintained as desired. By a like centrifuging operation the scum layer which forms at the top of the digester contents is broken down and returned as a manageable slurry.

---

Figure 1:
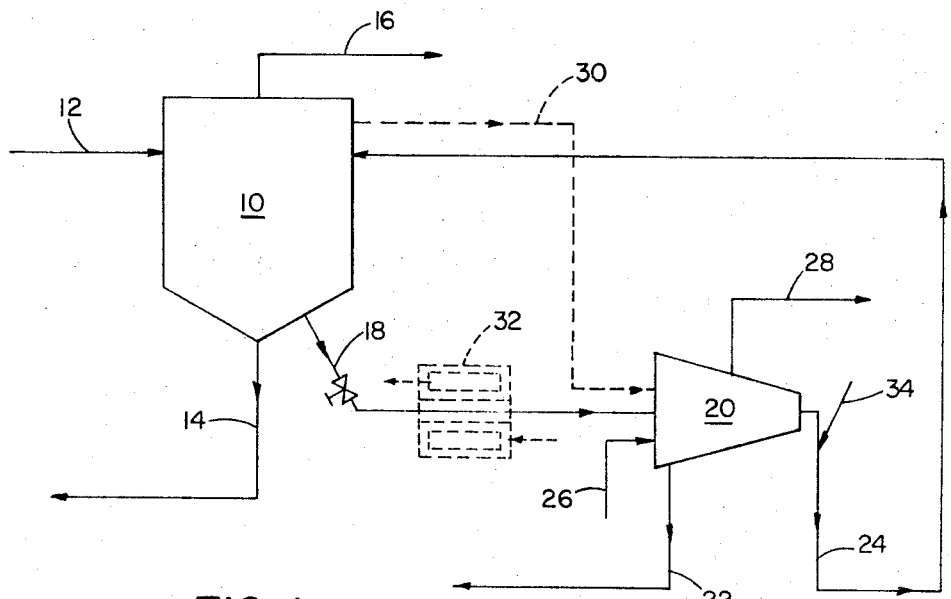

This invention relates to the anaerobic digestion of sludge such as sewage or industrial waste.

In a conventional anaerobic digestion process to which this invention is applicable, thickened sludge of the sewage or other waste, which may be or include waste sludge from activated sludge treatment, is subjected to anaerobic digestion in one or more digesters for a period of usually less than 30 days, the time depending upon the composition of the sewage being treated and process conditions and requirements. The digestion process may involve digestion in a single digester, normally with heating and agitation, or the partially digested sludge from a primary digester may be fed to a secondary digester for further digestion and settling. The digested sludge is usually dewatered for disposal by air drying, vacuum filters or centrifuges.

During anaerobic digestion biodegradable organics such as those of sewage are converted by microorganism digestion into various products, mainly organic acids which are converted to methane and carbon dioxide, ammonium bicarbonate and insoluble solids which constitute the digested sludge. The gaseous mixture given off, which is desirably about 65–75% $CH_4$, 35–25% $CO_2$, is removed and usually burned to provide heat requirements of the process. The process is a highly complex one, difficult to control because of many variables involved, particularly variations or fluctuations in the composition of waste entering the system and of the sludge fed to the digester.

Accurate control of the chemical condition of digesting sludge is extremely important to the existence and functioning of the microbes on which the digestion process depends. Without proper environment, bacterial action reduces in activity to an undesirable level, or produces unwanted quantities of obnoxious end products. Particularly important to control is the volatile acid content of the digestion environment, for if this becomes too high the microbic digestion process is seriously impaired, with potentially disastrous consequences in addition to inadequate digestion such as malfunctioning of the gas burning and sludge disposal systems.

Heretofore, the art has endeavored to prevent or remove excess digester acidity by chemical addition and to some extent by supernating. Chemical addition, usually lime, to neutralize acidity is expensive and may have adverse side effects on the digestion process. Supernating involves drawing off liquor called "supernatant" from a digester at some level where clear liquid can be found. Supernating is more practical where the system includes a secondary digester in which the sludge from the primary digester is allowed to settle without agitation, thus providing a supernatant relatively free of solids. A primary digester normally requires so much agitation and mixing for proper digestion operation that a true supernatant is not formed so that agitation must be stopped long enough to form one, which impairs the digestion process. Even secondary digester supernatant contains a substantial quantity of fine, light solids that build up in the system under supernating until their content in the digesters becomes excessive. Such excess fines not only interfere with the digestion process but also make it difficult to thicken the sludge adequately for disposal. Occasionally, this problem becomes so acute that the whole system has to be flushed out and the digestion cycle started anew.

The general object of this invention is to improve digester operation. Specific objects are to provide a better method than has heretofore existed for controlling the acid content of digesting sludge; to provide such a method which eliminates or reduces supernating and which makes it possible in many cases to dispense with secondary digesters; and to provide such a method which reduces or eliminates the need for chemical addition to effectuate acid control, which prevents the build-up of scum, and which assists in maintaining digester operation at maximum efficiency.

In accordance with the present invention digesting sludge is removed from a digester and processed in a centrifuge, preferably of the solid bowl continuous type, to produce a solids fraction which contains essentially all the undissolved solids and an overflow fraction which is essentially only mother liquor with solids dissolved therein. The solids fraction is returned for further digestion in the digester from which it was taken or to another digester. The overflow fraction, being mother liquor essentially free of suspended solids, may be returned to the headworks of the plant. In my process, separations as high as 90–95% or above solids removal are readily obtainable, particularly if minor amounts of a suitable flocculant are appropriately added. This leaves an overflow with insufficient suspended solids to cause solids build-up in the circuit.

If the mother liquor removed by centrifuging is replaced in the digester with waste containing insignificant quantities of acid, such as fresh sludge or plant effluent, the process will reduce acid content in the digester under stable acid generating conditions as a function of time, the rate of centrifuging and the volume of the digester contents. For example, if the centrifuging is conducted at a rate such as to process 5% per hour of the volume of digesting sludge in the digester to remove 60% of the mother liquor therefrom, the acid content of the liquid in the digester would be removed at the rate of 3% per hour.

If the concentrated sludge from centrifuging is returned to the same digester and the mother liquor removed is replaced by flesh sludge, the effect is to increase the consistency or percent solids in the digester. This may be desirable for increasing the capacity of the digester but may be undesirable for other reasons. Thus, increase in digesting solids content and decrease in liquid content are both factors tending to increase the acid content of the liquid. Moreover, digesters and correlated equipment are normally designed for functioning at a certain consistency or consistency range of the sludge in the digester, so that too much concentrating of the digesting sludge may cause malfunctioning in one way or another. However, a major advantage of my process is that the concentrating effect may be regualted from none up to maximum by adjusting the relative amounts of new sludge and/or plant effluent without significant solid content added to replace the mother liquor removed in centrifuging.

The centrifuging process of the invention is preferably utilized in conjunction with a primary digester, the sludge concentrated by centrifuging being returned to the same digester. Preferably, such a digester includes stirring or other means for thoroughly agitating and mixing the digester contents. However an accompanying advantage of my process is that it has a substantial mixing action. While my process may eliminate the need for a secondary digester, if secondary digestion is employed, the process can be utilized in conjunction with a secondary digester either by withdrawing the sludge from a primary digester and sending the de-liquored sludge to a secondary digester or by centrifuging in closed circuit with the secondary digester only.

Preferably the centrifuge or centrifuges are sealed to prevent ingress or egress of gas and are vented to the gas outlet from the digester or to some other suitable exhaust. This is not only to prevent the escape into the plant of noxious and possibly explosive gases given off during centrifuging but also, importantly, to prevent oxidation of the returned sludge which would have adverse effects on the anaerobic digestion.

Figure 2:
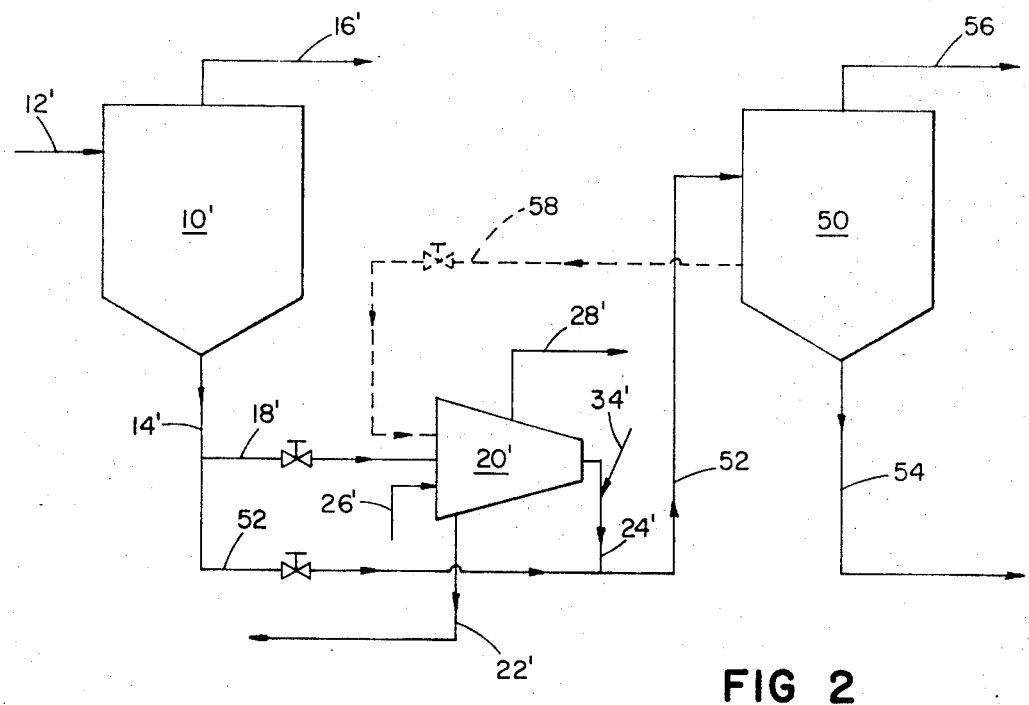

The invetnion will be more particularly described in connection with the accompanying drawing, wherein:

FIG. 1 is a diagrammatic flow sheet illustrating the method of the invention utilized in conjunction with a primary digester; and FIG. 2 is a diagrammatic flow sheet illustrating practice of the invention in conjunction with primary and secondary digesters.

In the drawing, the equipment involved is only diagrammatically illustrated because it is well known and commercially available. Referring to FIG. 1, primary anaerobic digester 10 is fed raw sludge via line 12. The feed sludge may be from sewage or industrial waste which has received usual pretreatments such as screening, degritting, and thickening. In so-called secondary treatment plants it may be or include waste activated sludge. Digested settled sludge is drawn from the bottom of the digester via line 14 for disposal, normally after dewatering on sand beds, by vacuum filtration or in centrifuges. The gas given off in the digester is vented via line 16 which usually leads to a burner system for supplying heat requirements of the plant including the heating of the digester when desired. The digester is preferably equipped with means (not indicated) for agitating and thoroughly mixing the digester contents above the bottom zone from which settled sludge is withdrawn for disposal.

In accordance with the invention, sludge from digester 10 is withdrawn via line 18 for processing in one or more centrifuges, a single centrifuge of the solid bowl continuous type being indicated at 20 which is fed via valved line 18. In centrifuge 20 a desired percentage of mother liquor is separated and may be returned to the headworks or disposed of via effluent discharge line 22. The partially deliquored sludge from the cake end discharge of the centrifuge is returned to the digester via line 24.

Any solids remaining in the mother liquor discharged via line 22 will be of the fine, light difficult to settle type. These should be reduced to a negligible quantity in order to avoid problems of fine solids build-up in the circuit as previously mentioned where some or all of the centrifuge effluent is returned to the preceding stages of the process, the headworks of the plant. Moreover these solids tend to be less completely digested than those which settle more readily and hence it is important that they be returned to the digester for further digestion. By suitable control of pool depth, solid bowl centrifuges can effect high percentage separations of this type of solids even without chemical assistance. I have found preferable for the purpose centrifuges of the type disclosed in Amero U.S. Patent No. 3,279,687, issued Oct. 18, 1966, which are commercially available, wherein adjustments of pool depth may be made while the machine is running and are automatically maintained when set despite feed fluctuations. However, chemical assistance may be required to obtain the desirably high solids separations of 90–95% or more. To this end there is shown a feed line 26 for chemical, normally a flocculant, from a source (not indicated) into the centrifuge where it is most advantageously added.

For reasons previously mentioned, it is at least highly desirable that the centrifuge be sealed gas-tight from the surrounding atmosphere. This can be accomplished by placing the centrifuge, its casing and outlets in a gas tight enclosure. More simply, however, centrifuges of the type preferred with gas tight seals between the housing and the shafts are commercially available, and it is a simple matter to fully enclose the effluent and solids discharge systems to render the centrifuge casing gas tight. Such an arrangement is contemplated in FIG. 1 with the centrifuge casing vented via line 28 which may suitably join vent line 16 from the digester.

It will be noted that the sludge fed to the centrifuge via line 18 is drawn from the bottom settling zone of digester 10, as is usually desirable. However, as digestion proceeds a scum may tend to form at the top of the digester contents made up in part of light and difficult to settle solids but also containing a large amount of heavy, settleable solids that are floated to the surface and held thereby attached gas bubbles. No longer exposed adequately to the required liquid environment, these solids cannot digest and so remain. If this scum becomes a sufficiently dense blanket it will prevent the escape of gas, with serious consequences to the digestion system and the gas burning system. In an attempt to cope with this problem many digesters are today equipped with mechanical scum breakers.

It is a feature of my method that it may be employed to prevent or substantially reduce the scum problem. To this end, a valved line 30 indicated by dotted lines may be provided leading from the upper zone of digester 10 in which scum will form to the centrifuge. At predetermined intervals, or when measurements indicate scum formation to or approaching an undesirable extent, the top zone of liquid is drawn off through line 30 and fed to centrifuge 20, either together with feed through line 18 or alternately therewith. De-scumming is preferably conducted while there is no feed to the digester from line 12, so that adequacy of scum removal may be gauged by drop in liquid level. Line 30 desirably has a plurality of inlets located about and/or extending into the liquid layer carrying the scum so that withdrawal will be essentially confined to that layer and the scum.

In the centrifuge, the bubbles attached to the scum layer solids are broken down into escaping gas. The scum solids, separated from mother liquor at their true density, are returned to the digester free to digest and settle. In this way it is possible to dispense with scum breakers, which are at best a less reliable remedy.

Desirably, the feed to centrifuge 20 is preheated, at this improves the efficiency of separation. To this end a heat exchanger 32, indicated by dotted lines, may be connected into feed line 18 (and feed line 30 as well). The heat exchanger is not necessarily extra equipment, as many digestion systems presently provide for circulation of digester contents through heat exchangers for maintaining the digesting sludge at a desired elevated temperature.

In FIG. 1 a line 34 is shown discharging into the cake end output line 24 from the centrifuge. This is primarily for discharging dilution water into line 24. For acid reduction purposes it is usually desirable to operate the centrifuge for maximum deliquoring, which may produce a solids slurry too viscous for pumping or recirculation. In such case, plant effluent will be added to the required extent via line 34. Also, addition of water to the digester may be desired for purposes of regulating concentration and in such case it may be conveniently added via line 34. Also, while my process largely eliminates the need for chemical addition to neutralize excess acidity, should such addition be necessary, the chemical, such as lime slurry, may be desirably added to the returning sludge in line 24 via line 34.

For most effective utilization of my process, determinations should be made at least at frequent intervals for acid content and consistency of the digester contents. Acid content may be determined by sample analysis for volatile acid content, by pH readings or even by the $CO_2$ to $CH_4$ ratio in the gas given off. Of these the volatile acid determination is usually the most reliable and is preferred. The buffering action of bicarbonate present may render pH readings an inaccurate measure of dissolved acid while changes in the ratio of gas components are not always due, entirely at least, to change in the acidity. Various devices are available and are used for determining with reasonable accuracy the consistency or percent solids of digester contents. At least frequent measurements should also be made of percent solids separation in the centrifuge, which may be determined according to the ratio of measured consistency of the feed to that of either the effluent or the cake end discharge of the centrifuge.

In the flow sheet of FIG. 2 equipment which may be the same as in FIG. 1 is indicated by primes of the same reference numerals. In the FIG. 2 flow sheet, sludge is displaced from primary digester 10' by incoming raw sludge via line 12' to a secondary digester, via discharge line 14' and connecting valved line 52. In digester 50 the sludge is not agitated as in digester 10' but is kept more or less quiescent for maximum settling. The settled fully digested sludge is sent to the disposal system via line 54. Gas is vented via line 56 to the burners or other exhaust system.

In the FIG. 2 arrangement, one or more centrifuges 20' could, and indeed preferably would, be connected up with primary digester 10' exactly as indicated in FIG. 1 and previously described. FIG. 2 however shows two other ways in which my method can be utilized in a primary-secondary digester system where the arrangement of FIG. 1 is not relied on to dispense with a secondary digester. These are preferably supplementary to rather than substitutes for the connections of FIG. 1 applied to primary digester 10', using the same centrifugal equipment in alternation with its use in the circuit of FIG. 1, or additional such equipment.

In FIG. 2, valved feed line 18' to centrifuge 20' is connected to discharge line 14' from digester 10' rather than to the settling zone of that digester as in FIG. 1. By closing valve line 52 and opening valve line 18' the sludge from digester 10' is processed in centrifuge 20' to remove the desired mother liquor fraction, which is disposed of via line 22' as in FIG. 1. The concentrated fraction is discharged via line 24' and the latter part of line 52 to secondary digester 50. Dilution water such as plant effluent may be added to the slurry via line 34' as in FIG. 1. As will be evident, this system can be used to reduce acid content and to adjust solids concentration of the feed to secondary digester 50, thus indirectly controlling acidity and solids concentration in that digester. It does not however affect these conditions in the primary digester where regulation thereof is normally more important.

In the other arrangement illustrated in FIG. 2, which may be used simultaneously or in alternation with the circuit just described or as a substitute therefor, sludge is drawn off from the settling zone of secondary digester 50 via line 58 shown dotted, and fed to centrifuge 20' where it is processed for removal of mother liquor and return of remaining sludge of digester 50 via lines 24' and 52. This is the circuit of FIG. 1 and may be used to control the same conditions in digester 50 in the same manner. This circuit also does not provide control over conditions in digester 10'.

The process may be operated and controlled in various ways depending on requirements. Particularly where the sludge being processed in the digestion system is of a type which has a tendency to develop excess volatile acid, the centrifuging equipment may be operated on a constant basis at a mother liquor removal rate calculated to remove sufficient acid to offset this tendency under normal conditions. This rate should be less than maximum capacity of the equipment to permit mother liquor removal at such sufficiently higher rate as may be required if the predicted rate is insufficient or an abnormal sudden increase in acid content should occur. The rate of mother liquor removal by centrifuging is subject to various controls, such as feed rate to and bowl speed of the centrifuge. Adjustments should be made with a view to maintaining the solids content of the centrifuge effluent at an acceptable level as previously indicated. Alternatively, the centrifuge equipment may be operated intermittently, whenever excessive acid content or a trend in that direction is detected, and at a mother liquor separation rate designed to correct or prevent this condition.

In order to reduce the acid content the mother liquor removed should be replaced with water of no or relatively low acid content. As previously indicated this may be the water of added raw sludge feed or water substantially free of solids, such as plant effluent. The choice of which of these replacement media to use, and to what extent, will be largely dictated by actual versus desired solids concentration within the digester. If the actual concentration is too low replacement with sludge will be indicated; if within the desired range, partial or entire replacement with the solids-free water will be indicated.

The desired volatile acid content within the digester is usually less than 1,000 p.p.m. of liquid, frequently less than 600 p.p.m. A volatile acid content of 2,000 p.p.m. is generally accepted as the danger point beyond which the excess acid condition will seriously impair digestion and may result in a sour digester which must be flushed out or diluted and its digestion cycle restarted or slowed down at great equipment down time and other expense. By my method such unfortunate occurrences, which are not infrequent with present controls, may be avoided and digesters, primary and/or secondary, may be kept operating at optimum conditions of volatile acid content and solids consistency without interference due to scum formation.

I claim:

1. The process for improving digestion in anaerobic digesters of sludge such as sewage and industrial waste which comprises withdrawing sludge from a said digester, centrifuging said sludge to form therefrom two fractions the first of which contains mother liquor essentially free of solids and contains dissolved acid and the second of which contains substantially all the solids, feeding only said second fraction directly to a said digester, adding to said digester to which said second fraction is fed sufficient liquor to replace at least the major part of the mother liquor removed from said sludge, said liquor being substantially lower in dissolved acid content than said mother liquor, and regulating the rate and amount of said mother liquor removal by said centrifuging and the rate and amount of addition of the liquor used to replace said removed mother liquor to minimize excessive acid build-up in said digester to which said second fraction is fed.

2. The process according to claim 1 wherein the liquor used to replace said removed mother liquor is selected between water containing raw sludge to be digested and water essentially free of solids to provide a desired solids consistency in said digester to which said second fraction is fed.

3. The process according to claim 1 wherein the sludge is withdrawn from a primary digester and said second fraction is fed to a secondary digester.

4. The process according to claim 1 wherein said sludge is withdrawn from a settling zone of a digester.

5. The process according to claim 1 wherein said withdrawn sludge is heated before centrifuging the same.

6. The process according to claim 1 wherein a chemical assistant to solids separation is added to said sludge prior to completion of said centrifuging thereof.

7. The process according to claim 1 wherein the solids content of said first fraction does not substantially exceed 5% of the total solids content of the sludge withdrawn for centrifuging.

8. The process according to claim 1 wherein access of air to the sludge being treated is prevented and gas escaping during centrifuging is vented.

9. The process according to claim 1 wherein said second fraction is fed to the digester from which the sludge was withdrawn.

10. The process according to claim 8 wherein the digester is a primary digester.

11. The process according to claim 8 wherein the digester is a secondary digester.

12. The process for improving digestion in anaerobic digesters of sludge such as sewage and industrial waste which comprises withdrawing a scum-carrying top layer of liquid from a said digester, centrifuging the same to break down gas bubbles in said scum and to form therefrom two fractions the first of which contains mother liquor essentially free of solids and the second of which contains substantially all the solids, and feeding only said second fraction directly to a said digester for further digestion.

13. The process according to claim 12 wherein said second fraction is fed to the digester from which said sludge was withdrawn.

14. The process according to claim 12 wherein access of air to the material being treated is prevented and gas escaping during centrifuging is vented.

15. The process according to claim 12 wherein said withdrawn scum-carrying layer of liquid is heated prior to centrifuging the same.

References Cited

UNITED STATES PATENTS 3,226,317   12/1965   Albertson _____ 210—6

OTHER REFERENCES

Schroepfer, G. J., et al.: Development of the Anaerobic Contact Process, Sewage and Industrial Wastes, February 1959, vol. 31, pp. 164–171, 175–180 and 184 relied on (P.O.S.L.).

MICHAEL E. ROGERS, Primary Examiner

U.S. Cl. X.R.

210—10, 12, 13